US008314913B2

(12) United States Patent
Um et al.

(10) Patent No.: US 8,314,913 B2
(45) Date of Patent: Nov. 20, 2012

(54) LIQUID CRYSTAL DISPLAY WITH SUBPIXELS HAVING ALTERNATELY DISPOSED BRANCHES

(75) Inventors: Yoon-Sung Um, Yongin-si (KR); Su-Jeong Kim, Seoul (KR); Hye-Ran You, Incheon (KR); Jae-Jin Lyu, Yongin-si (KR)

(73) Assignee: Samsung Display Co., Ltd. (KR)

( * ) Notice: Subject to any disclaimer, the term of this patent is extended or adjusted under 35 U.S.C. 154(b) by 559 days.

(21) Appl. No.: 12/564,843

(22) Filed: Sep. 22, 2009

(65) Prior Publication Data

US 2010/0110358 A1 May 6, 2010

(30) Foreign Application Priority Data

Oct. 31, 2008 (KR) ........................ 10-2008-0107984

(51) Int. Cl.
*G02F 1/1343* (2006.01)
*G02F 1/136* (2006.01)
*G02F 1/1337* (2006.01)

(52) U.S. Cl. ........... 349/141; 349/48; 349/129; 349/144

(58) Field of Classification Search .................... 349/48, 349/141, 144, 129
See application file for complete search history.

(56) References Cited

U.S. PATENT DOCUMENTS

2002/0163604 A1* 11/2002 Kim et al. ........................ 349/43
2005/0275763 A1* 12/2005 Song et al. ....................... 349/43
2006/0146243 A1* 7/2006 Nakanishi et al. ............ 349/139
2009/0040412 A1* 2/2009 Lee et al. ........................ 349/48

* cited by examiner

*Primary Examiner* — Michael Caley
(74) *Attorney, Agent, or Firm* — Innovation Counsel LLP

(57) ABSTRACT

A liquid crystal display according to an exemplary embodiment of the present invention includes: a first insulation substrate; a pixel electrode formed on the first insulation substrate, and including a first subpixel electrode and a second subpixel electrode separated from each other; a second insulation substrate facing the first insulation substrate; a common electrode formed on the second insulation substrate and facing the pixel electrode; and a liquid crystal layer formed between the pixel electrode and the common electrode, and including a plurality of liquid crystal molecules, wherein the first and second subpixel electrodes respectively include a plurality of minute branches, and the minute branches of the first subpixel electrode and the minute branches of the second subpixel electrode are alternately disposed in a unit of at least one minute branch.

15 Claims, 13 Drawing Sheets

270
31
180
191b
191a

LIQUID CRYSTAL DISPLAY WITH SUBPIXELS HAVING ALTERNATELY DISPOSED BRANCHES

CROSS-REFERENCE TO RELATED APPLICATION

This application claims priority to and the benefit of Korean Patent Application No. 10-2008-0107984 filed in the Korean Intellectual Property Office on Oct. 31, 2008, the entire contents of which are incorporated herein by reference.

BACKGROUND (a) Technical Field

Embodiments of the present invention generally relate to a liquid crystal display.

(b) Description of the Related Art

A liquid crystal display (LCD) is one of the most widely used flat panel displays (FPD), and it is composed of two display panels on which field generating electrodes are formed, and a liquid crystal layer interposed between the two display panels. A voltage is applied to the field generating electrodes to generate an electric field on the liquid crystal layer, and the orientation of liquid crystal molecules of the liquid crystal layer is determined and the polarization of incident light is controlled through the generated electric field to display an image.

Among the LCDs, a vertical alignment (VA) mode LCD, which aligns LC molecules such that their long axes are perpendicular to the panels in the absence of an electric field, is spotlighted because of its high contrast ratio and wide reference viewing angle. A reference viewing angle is defined as a viewing angle that makes the contrast ratio equal to 1:10 or as a limit angle for inversion in luminance between the grays.

In the VA mode LCD, a wide viewing angle can be realized by cutouts such as minute slits in the field-generating electrodes and protrusions on the field-generating electrodes. Since the cutouts and protrusions can determine the tilt directions of the LC molecules, the tilt directions can be distributed in several ways by using the cutouts and protrusions such that the reference viewing angle is widened.

On the other hand, the VA mode liquid crystal display has lower side visibility compared with front visibility, such that one pixel is divided into two subpixels and a high voltage and a low voltage are applied to the two subpixels to solve this problem. Accordingly, the arrangement directions of the liquid crystal molecules corresponding to two subpixel electrodes are different, thereby improving the visibility of the right and left viewing angle directions.

According to the conventional method in which the pixel electrode is divided into two subpixel electrodes that are applied with different voltages to increase the visibility, it is advantageous for the size of the pixel area applied with the low voltage to be larger than the size of the pixel area applied with the high voltage for the improvement of visibility.

However, there may be a problem in that the brightness of the liquid crystal display is decreased according to the increasing of the size of the pixel area applied with the low voltage.

The above information disclosed in this Background section is only for enhancement of understanding of the background of the disclosure and therefore it may contain information that does not form the prior art that is already known in this country to a person of ordinary skill in the art.

SUMMARY

Embodiments of the present invention provide a liquid crystal display having excellent visibility without a decrease of the brightness of the liquid crystal display.

A liquid crystal display according to an exemplary embodiment of the present invention includes: a first insulation substrate; a pixel electrode formed on the first insulation substrate, and including a first subpixel electrode and a second subpixel electrode separated from each other; a second insulation substrate facing the first insulation substrate; a common electrode formed on the second insulation substrate and facing the pixel electrode; and a liquid crystal layer formed between the pixel electrode and the common electrode, and including a plurality of liquid crystal molecules, wherein the first and second subpixel electrodes respectively include a plurality of minute branches, and the minute branches of the first subpixel electrode and the minute branches of the second subpixel electrode are alternately disposed in a unit of at least one minute branch.

The first subpixel electrode and the second subpixel electrode may be disposed in one pixel, and the ratio of the areas of the first subpixel electrode and the second subpixel electrode is in the range of 1.5:1 to 1:1.5.

The voltage applied to the first subpixel electrode and the voltage applied to the second subpixel electrode may have the same polarity, and the magnitude of the voltage applied to the first subpixel electrode may be larger than that of the voltage applied to the second subpixel electrode.

The entire shape of the pixel electrode may be a quadrangle, the first subpixel electrode may include a first stem formed according to the quadrangle edge of the pixel electrode, and the minute branches of the first subpixel electrode may obliquely extend from the first stem.

The second subpixel electrode may include a second stem with a crossed-shape formed on the center of the pixel electrode, and the minute branches may extend obliquely from the second stem of the second subpixel electrode.

The minute branches of the first subpixel electrode and the minute branches of the second subpixel electrode may be alternatively disposed in the unit of a plurality of minute branches, and the plurality of minute branches may include two to four minute branches.

The liquid crystal display may further include a pair of data lines formed on the first substrate, and disposed on the left and right sides of the pixel electrode, wherein the pair of data lines may include curved portions alternately connected to each other and periodically curved, the first subpixel electrode may include a third stem closely parallel to one data line of the pair of data lines, and the minute branches of the first subpixel electrode may be extended from the third stem.

The second subpixel electrode may include a fourth stem closely parallel to the remaining data line of the pair of data lines, and the minute branches of the second subpixel electrode may be extended from the fourth stem.

The first subpixel electrode and the second subpixel electrode may include an assistant extending from the minute branches.

The liquid crystal display may further include a pair of data lines formed on the first substrate, and disposed on the left and right sides of the pixel electrode, wherein the pair of data lines may include curved portions alternately connected to each other and periodically curved, the first subpixel electrode may include a pair of third stems parallel to the pair of data lines, and the minute branches of the first subpixel electrode may be extended from the pair of third stems.

The second subpixel electrode may include a fourth stem disposed parallel to and between the pair of data lines, and the minute branches of the second subpixel electrode may be extended from the fourth stem.

The pixel electrode may include four regions having different directions of the minute branches.

According to an exemplary embodiment of the present invention, one pixel is divided into two subpixel electrodes having almost the same area, and two subpixel electrodes are alternately disposed with respect to each other such that visibility may be improved while maintaining the areas of the regions of the subpixel electrode applied with the high voltage and the subpixel electrode applied with the low voltage substantially the same. Accordingly, a liquid crystal display having excellent visibility and transmittance may be provided.

DETAILED DESCRIPTION

Figure 1:
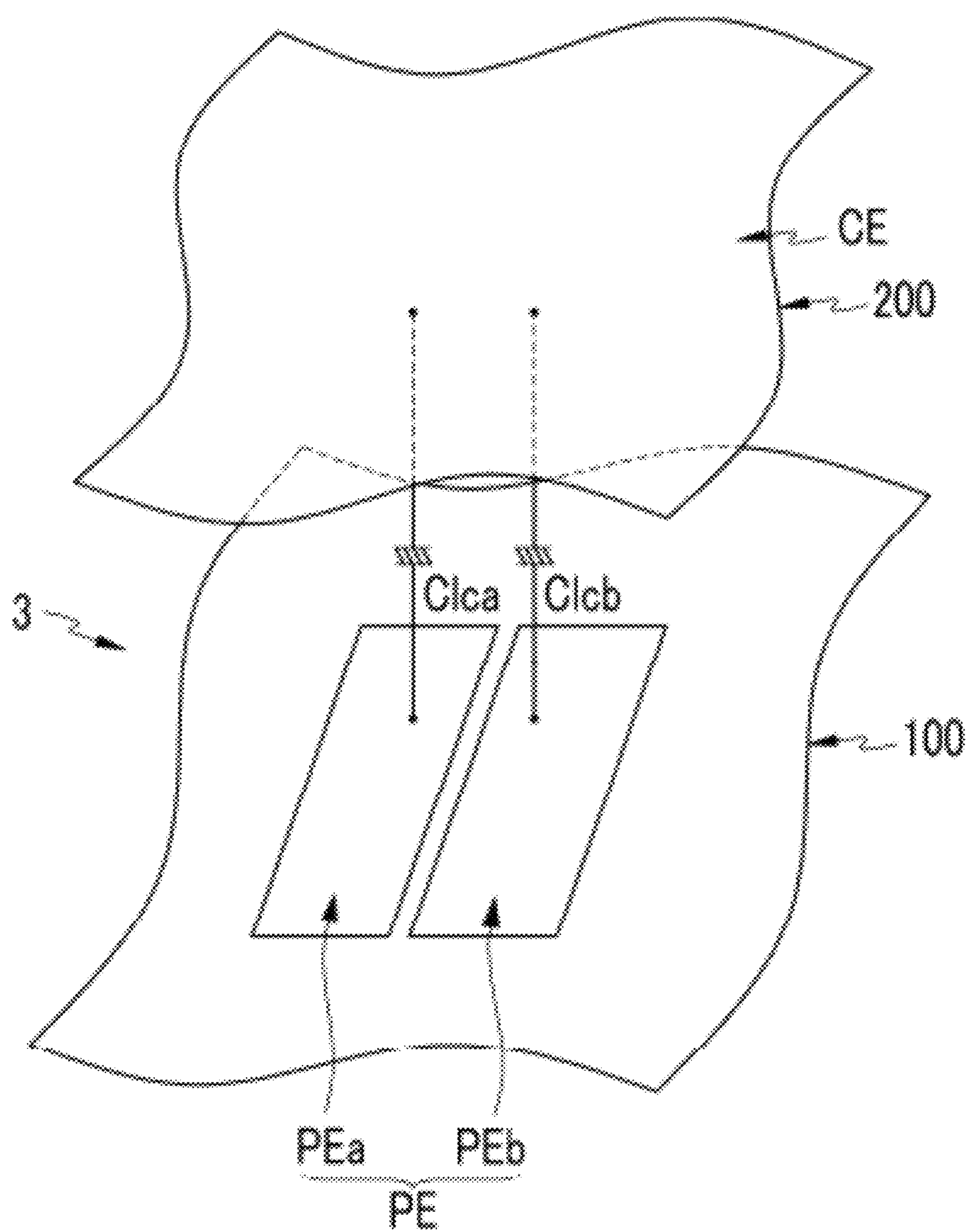
FIG. 1 an equivalent circuit diagram of one pixel in a liquid crystal display according to an exemplary embodiment of the present invention.

Embodiments of the present invention will be described more fully hereinafter with reference to the accompanying drawings. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

A liquid crystal display according to an exemplary embodiment of the present invention will be described with reference to FIG. 1. FIG. 1 is an equivalent circuit diagram of one pixel in a liquid crystal display according to an exemplary embodiment of the present invention.

Referring to FIG. 1, a liquid crystal display according to an exemplary embodiment of the present invention includes signal lines including a plurality of gate lines GL (not shown) and a plurality of data lines DL (not shown), and a plurality of pixels PE connected to the signal lines. In the point of view of a structure, the liquid crystal display includes a lower panel 100 and an upper panel 200 facing each other, and a liquid crystal layer 3 interposed therebetween.

Each pixel PE includes a pair of subpixels PEa and PEb. Each of the subpixels PEa and PEb respectively include a switching element (not shown) connected to the signal lines GL and DL, and a liquid crystal capacitor Clca and Clcb and a storage capacitor Cst (not shown) connected thereto. The storage capacitor Cst may be omitted, if necessary. The respective areas of the regions occupied with the subpixels PEa and PEb may be almost the same.

The switching element may be a three terminal element such as a thin film transistor provided on the lower panel 100, a control terminal thereof is connected to the gate line GL, an input terminal thereof is connected to the data line DL, and an output terminal thereof is connected to the liquid crystal capacitors Clca/Clcb. Each of the subpixels PEa and PEb may be connected to different switching elements or to one switching element.

The liquid crystal capacitors Clca/Clcb may have two terminals of subpixel electrodes PEa/PEb of the lower panel 100 and a common electrode CE of the upper panel 200, and the liquid crystal layer 3 between the two subpixel electrodes PEa/PEb and CE serves as a dielectric material. Each of the pair of subpixel electrodes PEa and PEb are separated from each other and form one pixel electrode PE. The common electrode CE is formed on the whole surface of the upper panel 200 and receives the common voltage Vcom. The liquid crystal layer 3 has negative dielectric anisotropy. The liquid crystal molecules of the liquid crystal layer 3 may be arranged such that a longitudinal axis thereof is perpendicular to the surfaces of the two panels in the case that an electric field does not exist.

The data voltage applied to the liquid crystal capacitor Clca of the first subpixel PEa is higher than the data voltage applied to the liquid crystal capacitor Clcb of the second subpixel PEb. Therefore, when the voltages of the first and second liquid crystal capacitors Clca and Clcb are appropriately adjusted, it is possible to make an image viewed from the side be as similar as possible to an image viewed from the front, and as a result, it is possible to improve side visibility.

The storage capacitor Cst functions as an auxiliary capacitor for the liquid crystal capacitor Clca/Clcb. The storage capacitor Cst includes a pixel electrode 191 (shown, e.g., in FIG. 2) and a separate signal line (not shown), which is provided on the lower panel 100 and overlaps the pixel electrode 191 via an insulator, and the separate signal line is applied with a predetermined voltage such as a common voltage Vcom. Alternatively, the storage capacitor Cst may include the pixel electrode PE and a previous gate line, which overlaps the pixel electrode PE via an insulator.

For color display, each pixel PE uniquely represents one of three primary colors (i.e., spatial division) or each pixel PE sequentially represents the three primary colors in turn (i.e., temporal division), such that a spatial or temporal sum of the primary colors is recognized as a desired color. An example of a set of the three primary colors includes red, green, and blue colors. Although not shown, the color filter may be disposed on or under the subpixel electrodes PEa and PEb of the lower panel 100, or may be formed under the common electrode CE of the upper panel 200.

At least one polarizer (not shown) may be attached on the outer side of the liquid crystal panel assembly, and the polarization axes of two polarizers may be crossed. In a reflective liquid crystal display, one of two polarizers may be omitted. In the case of the crossed polarizers, light incident on the liquid crystal layer 3 is blocked in the absence of the application of the electric field.

Figure 2:
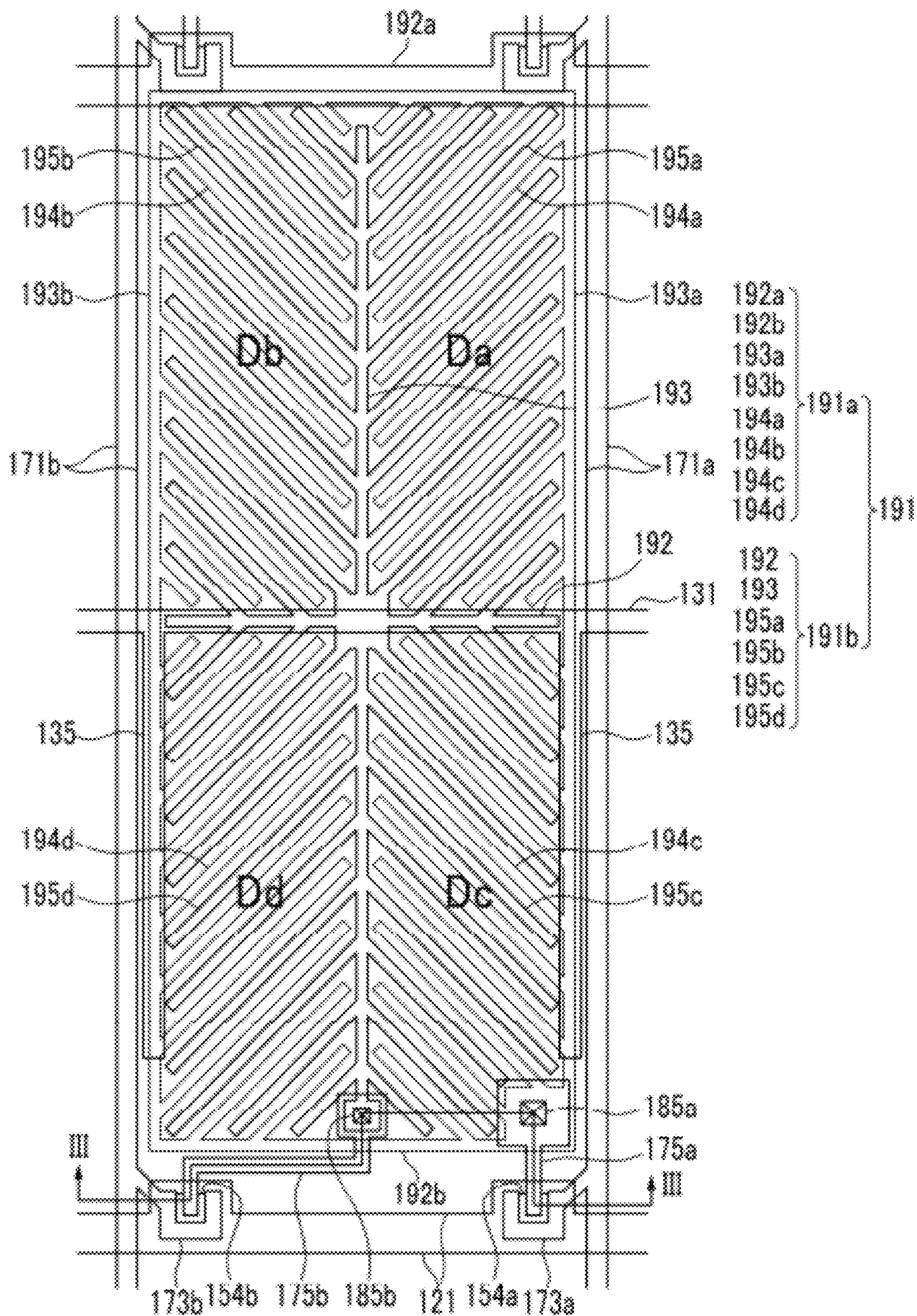
FIG. 2 is a layout view of a liquid crystal display according to an exemplary embodiment of the present invention.

Next, the structure of the liquid crystal display will be described in detail with reference to FIG. 2 and FIG. 3. FIG. 2 is a layout view of a liquid crystal display according to an exemplary embodiment of the present invention, and FIG. 3 is a cross-sectional view of the liquid crystal display shown in FIG. 2 taken along the line III-III.

Figure 3:
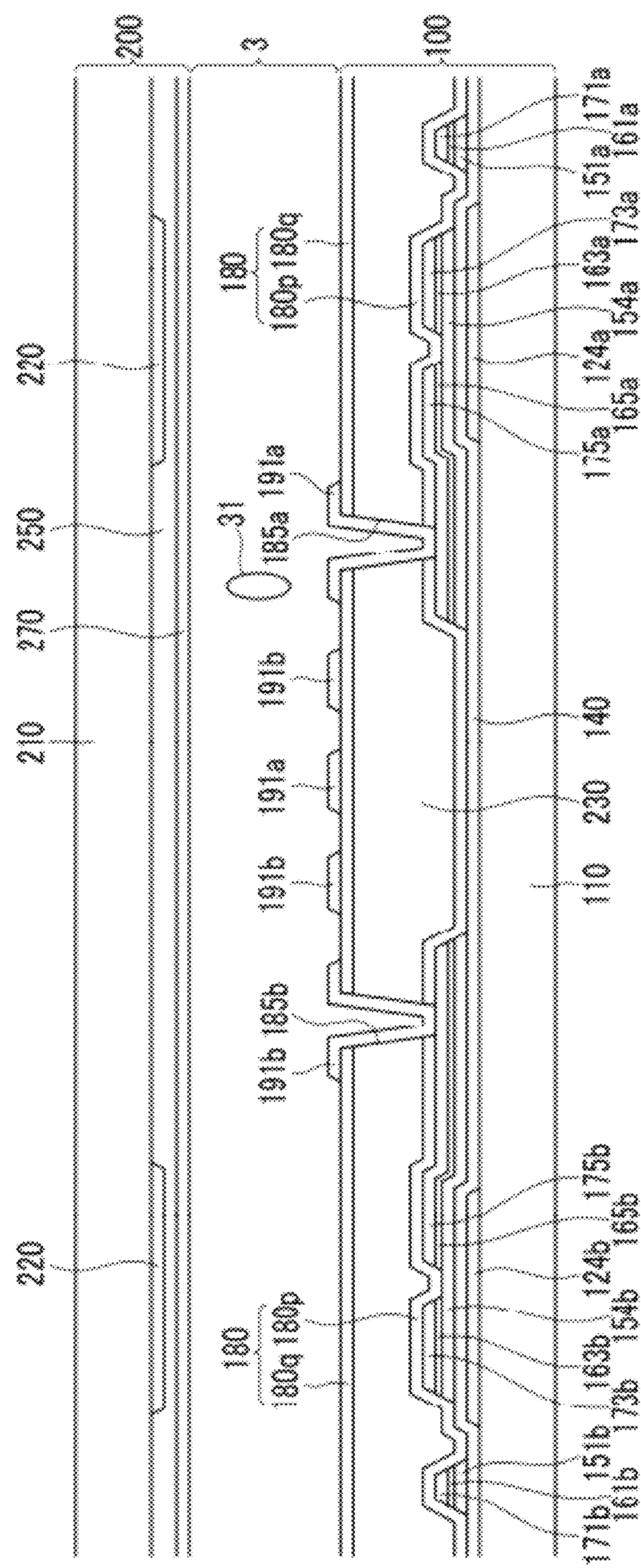
FIG. 3 is a cross-sectional view of the liquid crystal display shown in FIG. 2 taken along the line III-III.

Referring to FIG. 3, the liquid crystal display according to the present exemplary embodiment includes a lower panel 100 and an upper panel 200 that face each other, and a liquid crystal layer 3 interposed therebetween.

First, the lower panel 100 will be described according to an embodiment.

A plurality of gate lines 121 and a plurality of storage electrode lines 131 are formed on an insulation substrate 110.

The gate lines 121 transmit gate signals and extend in a transverse direction. Each of the gate lines 121 includes a plurality of the first and second gate electrodes 124*a* and 124*b* protruding upward.

The storage electrode lines 131 extend substantially parallel to the gate lines 121, and a plurality of storage electrodes 135 extend parallel to a direction of data lines 171*a* and 171*b*. The shape and arrangement of the storage electrode lines 131 may be changed in a variety of ways.

A gate insulating layer 140 is formed on the gate lines 121 and the storage electrode lines 131.

A plurality of semiconductor stripes 151*a* and 151*b* may be made of hydrogenated amorphous silicon ("amorphous silicon" is simply referred to as "a-Si") and may be formed on the gate insulating layer 140. The semiconductor stripes 151*a* and 151*b* extend in the longitudinal direction, and include a plurality of projections 154*a* and 154*b* extending toward the gate electrodes 124*a* and 124*b*.

A plurality of pairs of ohmic contact stripes and islands 161*a*, 161*b*, 163*a*, 163*b*, 165*a*, and 165*b* are formed on the semiconductor stripes 151*a* and 151*b*, and the ohmic contacts 161*a*, 161*b*, 163*a*, 163*b*, 165*a*, and 165*b* may be made of silicide or n+ hydrogenated amorphous silicon in which an n-type impurity such as phosphorus is highly doped.

A plurality of pairs of data lines 171*a* and 171*b* and a plurality of pairs of drain electrodes 175*a* and 175*b* are formed on the ohmic contacts 161*a*, 161*b*, 163*a*, 163*b*, 165*a* and 165*b*, and the gate insulating layer 140.

The data lines 171*a* and 171*b* extend substantially in a longitudinal direction, thereby intersecting the gate lines 121 and the storage electrode lines 131. The data lines 171*a* and 171*b* respectively have a plurality of first and second source electrodes 173*a* and 173*b* toward the first and second gate electrodes 124*a* and 124*b* and curved with a substantially "U" shape, and the first and second source electrodes 173*a* and 173*b* are opposite to the first and second drain electrodes 175*a* and 175*b* with respect to the first and second gate electrodes 124*a* and 124*b*.

Each first and second drain electrode 175*a* and 175*b* extends upward from one end portion enclosed by the source electrode 173*a* and has the other end portion having a wide area for connection with another layer.

However, the shape and arrangement of the data lines 171*a* and 171*b* as well as the first and second drain electrodes 175*a* and 175*b* may be changed in a variety of ways.

A first/second gate electrode 124*a*/124*b*, a first/second source electrode 173*a*/173*b*, and a first/second drain electrode 175*a*/175*b* respectively form a first/second thin film transistor (TFT) Qa/Qb along with a first/second semiconductor 154*a*/154*b*, and a channel of the first/second thin film transistor Qa/Qb is formed on the first/second semiconductor 154*a*/154*b* between the first/second source electrode 173*a*/173*b* and the first/second drain electrode 175*a*/175*b*.

The ohmic contacts 161*a*, 161*b*, 163*a*, 163*b*, 165*a*, and 165*b* are interposed only between the underlying semiconductor islands 154*a* and 154*b*, and the overlying data lines 171*a* and 171*b* and drain electrodes 175*a* and 175*b*, and reduce contact resistance between them. The semiconductors 151*a* and 151*b* have a portion that is exposed without being covered by the data lines 171*a* and 171*b* and the drain electrodes 175*a* and 175*b*, and a portion between the source electrodes 173*a* and 173*b* and the drain electrodes 175*a* and 175*b*.

The ohmic contacts 161*a*, 161*b*, 163*a*, 163*b*, 165*a*, and 165*b*, the data lines 171*a*, 171*b*, 173*a*, and 173*b* and the drain electrodes 175*a* and 175*b* have the same planar shape, and also have substantially the same planar shape as the semiconductors 151*a* and 151*b* except for the exposed portion between the drain electrodes 175*a* and 175*b*, and the source electrodes 173*a* and 173*b*.

A lower passivation layer 180*p* may be made of silicon nitride or silicon oxide and may be formed on the data lines 171*a* and 171*b*, the drain electrodes 175*a* and 175*b*, and the exposed portions of the semiconductors 151*a* and 151*b*.

A plurality of color filters 230 are formed on the lower passivation layer 180*p*. Here, the lower passivation layer 180*p* may prevent the pigments of the color filters 230 from flowing into the exposed semiconductors 151*a* and 151*b*. Each color filter 230 may display one of the primary colors such as the three primary colors of red, green, and blue. The color filters 230 may include a photosensitive organic material.

An upper passivation layer 180*q* is formed on the color filters 230. The upper passivation layer 180*q* may be made of an inorganic insulating material. The upper passivation layer 180*q* prevents the color filters 230 from lifting and suppresses contamination of the liquid crystal layer 3 by the organic material such as a solvent flowing from the color filters 230 such that defects, for example an afterimage that may be generated during driving, may be prevented.

A plurality of pixel electrodes 191 is formed on the upper passivation layer 180*q*. Each pixel electrode 191 includes first and second subpixel electrodes 191*a* and 191*b* that are separated from each other and are alternately disposed.

The overall shape of the first subpixel electrode 191*a* may be substantially a quadrangle, and the four edges include two transverse stems 192*a* and 192*b* that are parallel to each other and two longitudinal stems 193*a* and 193*b* that are parallel to each other wherein each meets respective ends of the transverse stems 192*a* and 192*b*. Also, the first subpixel electrode 191*a* includes minute branches 194*a*, 194*b*, 194*c*, and 194*d* extending from the two transverse stems 192*a* and 192*b* and the two longitudinal stems 193*a* and 193*b*. Each first pixel electrode is divided into first to fourth subregions Da-Dd by the minute branches 194*a*, 194*b*, 194*c*, and 194*d*.

The first minute branch 194*a* obliquely extends from the transverse stem 192*a* or the longitudinal stem 193*a* in the lower-left direction, and the second minute branch 194*b* obliquely extends from the transverse stem 192*a* or the longitudinal stem 193*a* in the lower-right direction. Also, the third minute branch 194*c* obliquely extends from the transverse stem 192*a* or the longitudinal stem 193*a* in the upper-left direction, and the fourth minute branch 194*d* obliquely extends from the transverse stem 192*a* or the longitudinal stem 193*a* in the upper-right direction.

The first to fourth minute branches 194*a*-194*d* form an angle of about 45 degrees or 135 degrees with the gate lines 121 or the transverse stems 192*a* and 192*b*. Also, the minute branches 194*a*-194*d* of two neighboring subregions may be crossed.

The overall shape of the second subpixel electrodes 191*b* may be substantially a quadrangle, and includes a cross-shaped stem having a transverse stem 192 and a longitudinal stem 193 that are crossed. Also, the second subpixel electrode 191*b* includes minute branches 195*a*, 195*b*, 195*c*, and 195*d* extending from the transverse stem 192 and the longitudinal stem 193.

The first minute branch 195*a* obliquely extends from the transverse stem 192 or the longitudinal stem 193 in the upper-right direction, and the second minute branch 195*b* obliquely extends from the transverse stem 192 or the longitudinal stem 193 in the upper-left direction. Also, the third minute branch 195*c* obliquely extends from the transverse stem 192 or the longitudinal stem 193 in the lower-right direction, and the fourth minute branch 195*d* obliquely extends from the transverse stem 192 or the longitudinal stem 193 in the lower-left direction.

The first to fourth minute branches 195*a*-195*d* of the second subpixel electrode 191*b* also form an angle of about 45 degrees or 135 degrees with the gate lines 121 or the transverse stem 192. Also, the minute branches 195*a*-195*d* of two neighboring subregions Da-Dd may be crossed.

The first to fourth minute branches 194*a*-194*d* of the first subpixel electrode 191*a* and the first to fourth minute branches 195*a*-195*d* of the second subpixel electrode 191*b* are alternately disposed.

The first subpixel electrode 191*a* and the second subpixel electrode 191*b* may occupy almost the same area of the region.

The first subpixel electrode 191*a* and the second subpixel electrode 191*b* are physically and electrically connected to the first drain electrode 175*a* and the second drain electrode 175*b* through contact holes 185*a* and 185*b*, and may receive different data voltages from the first drain electrode 175*a* and the second drain electrode 175*b*. The polarities of the data voltages applied to the first subpixel electrode 191*a* and the second subpixel electrode 191*b* may be the same.

On the other hand, in a liquid crystal display according to another exemplary embodiment of the present invention, the first subpixel electrode 191*a* and the second subpixel electrode 191*b* may be applied with the data voltage from one drain electrode, however, the voltage may be controlled so that the voltage applied between the first subpixel electrode 191*a* and the common electrode 270 and the voltage applied between the second subpixel electrode 191*b* and the common electrode 270 are different from each other because of an additional storage capacitor.

Next, the upper panel 200 will be described according to an embodiment.

A light blocking member 220 is formed on an insulating substrate 210 that may be made of transparent glass or plastic. The light blocking member 220 may be referred to as a black matrix and prevents light leakage.

The light blocking member 220 has a plurality of openings (not shown) facing the pixel electrodes 191 and having substantially the same shape thereof, and prevents light leakage between them. However, the light blocking member 220 may include portions corresponding to the gate lines 121, the data lines 171, and the thin film transistors.

An overcoat 250 is formed on the light blocking member 220. The overcoat 250 may be made of an organic insulator, and provides a flat surface. The overcoat 250 may be omitted.

A common electrode 270 is formed on the overcoat 250. The common electrode 270 may be made of a transparent conductor such as ITO or IZO.

Alignment layers (not shown) may be formed on the inner surface of the display panels 100 and 200, and may be vertical alignment layers. Polarizers (not shown) may be formed on the outer surface of the display panels 100 and 200, the polarization axis of two polarizers may be crossed, and one polarization axis thereof may be parallel to the gate lines 121. In the case of a reflective liquid crystal display, one of two polarizers may be omitted.

The liquid crystal display according to the present exemplary embodiment may further include a retardation film (not shown) to compensate the retardation of the liquid crystal layer 3. The liquid crystal display may include a backlight unit (not shown) for providing light to the polarizers, the phase retardation film, the display panels 100 and 200, and the liquid crystal layer 3.

The liquid crystal layer 3 has negative dielectric anisotropy, and may be oriented such that the major axes of the liquid crystal molecules 31 of the liquid crystal layer 3 are almost perpendicular to the surfaces of the two display panels 100 and 200 when no electric field is applied. Accordingly, incident light is blocked by the crossed polarizers in the state where no electric field is applied.

If the common electrode 270 is applied with the common voltage and the pixel electrode 191 is applied with the data voltage, an electric field is formed on the liquid crystal layer 3. Thus, liquid crystal molecules 31 of the liquid crystal layer 3 change directions so that the major axes thereof become perpendicular to the direction of the electric field in response to the electric field. The degree of change of the polarization of the light that is incident on the liquid crystal layer 3 is changed according to the inclination degree of the liquid crystal molecules 31, and this change of the polarization appears as a change of the transmittance by the polarizer, thereby displaying images of the liquid crystal display.

Here, the edges of the minute branches 194*a*-194*d* and 195*a*-195*d* of the first and second subpixel electrodes 191*a* and 191*b* distort the electric field to make the horizontal components perpendicular to the edges of the minute branches 194*a*-194*d* and 195*a*-195*d*, and the inclination direction of the liquid crystal molecules 31 is determined by the horizontal components.

Also, as above-described in an exemplary embodiment of the present invention, the length directions in which the minute branches 194*a*-194*d* and 195*a*-195*d* of the first and second subpixel electrodes 191*a* and 191*b* are extended in one pixel PE are all four directions such that the inclined directions of the liquid crystal molecules 31 are also in all four directions. Therefore, the viewing angle of the liquid crystal display is widened by varying the inclined directions of the liquid crystal molecules.

Figure 4A:
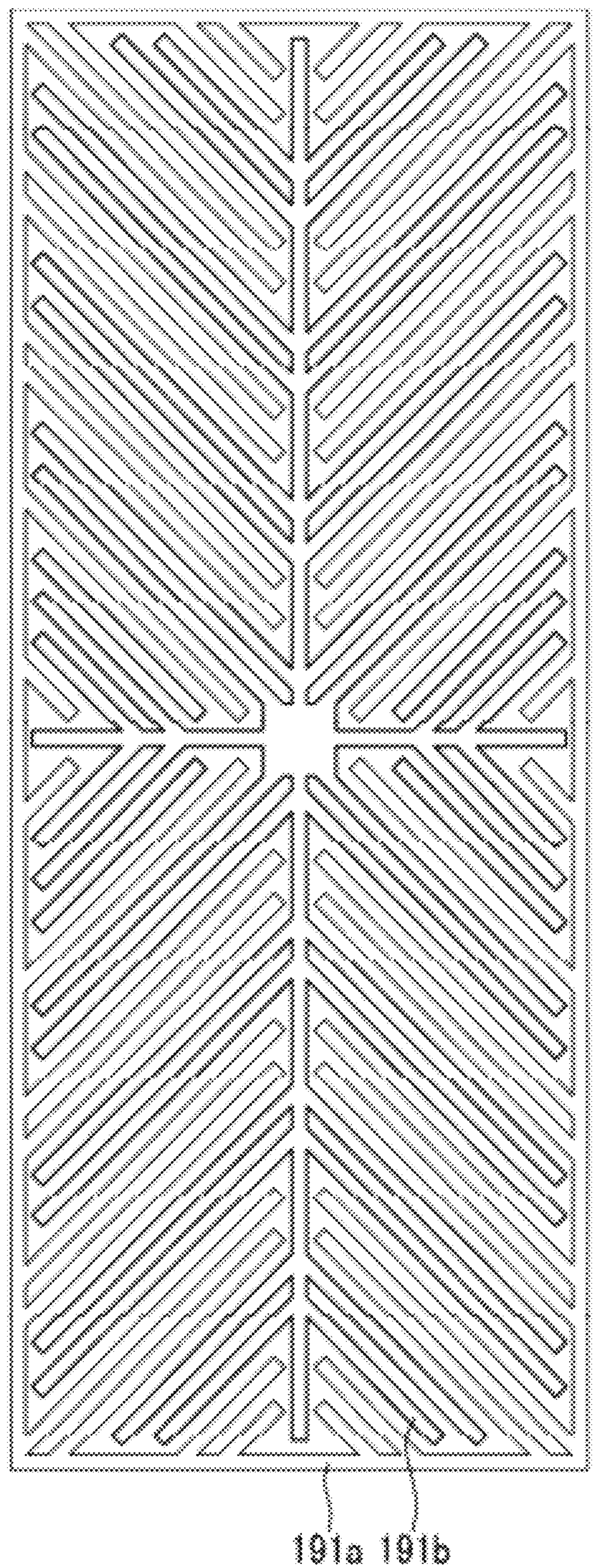
FIG. 4A to FIG. 4C are top plan views of examples of a pixel electrode in a liquid crystal display according to another exemplary embodiment of the present invention.
Figure 4B:
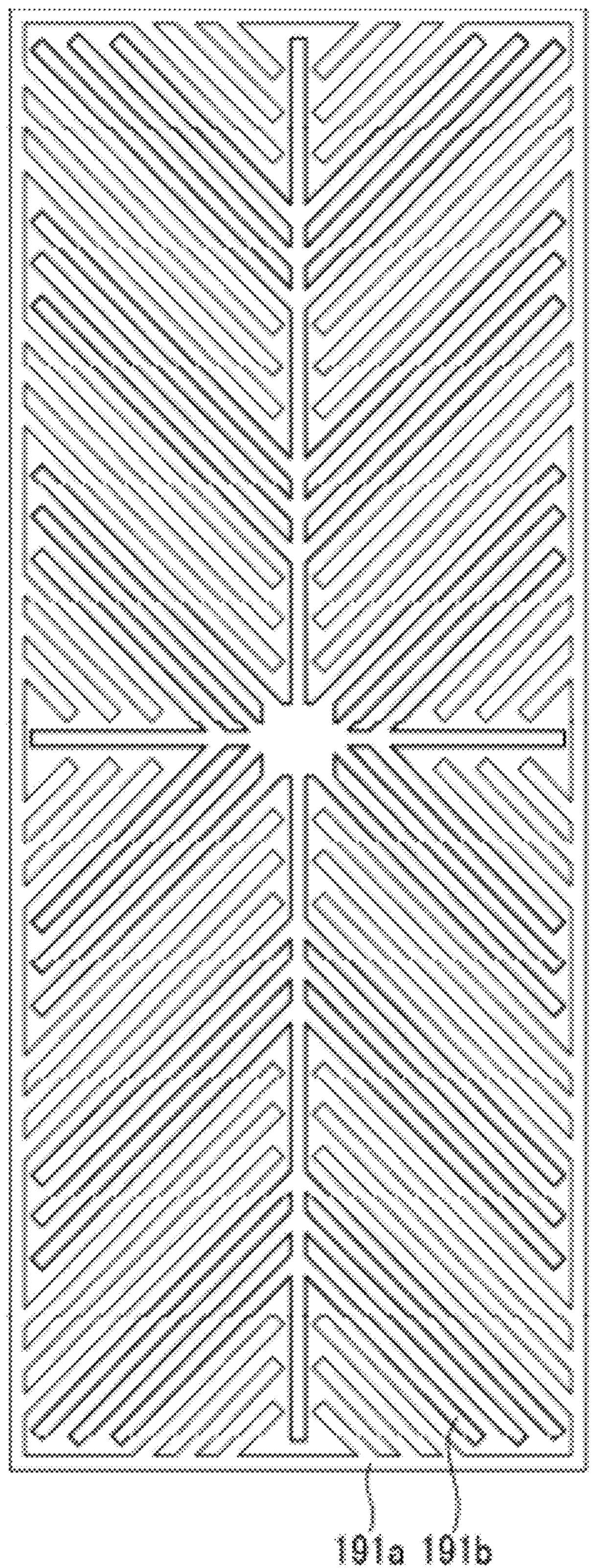
Figure 4C:
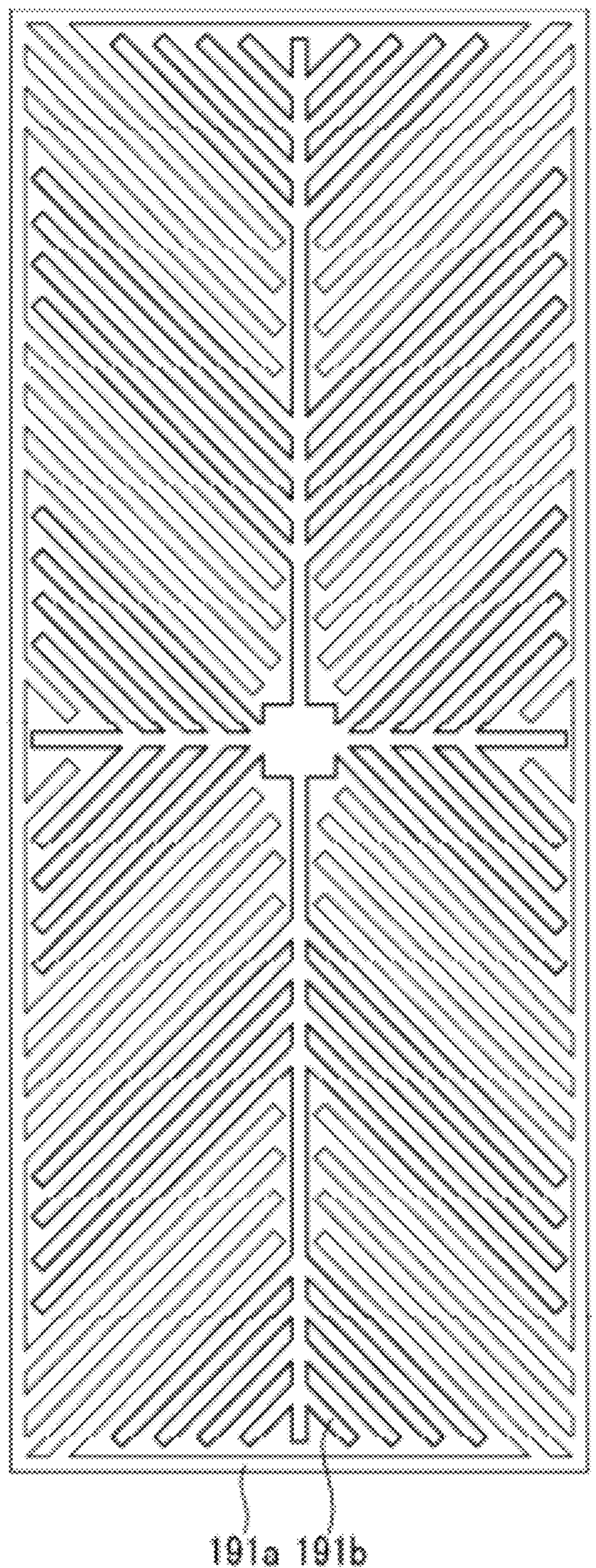

Next, a shape of the first subpixel electrode 191*a* and the second subpixel electrode 191*b* of a liquid crystal display according to another exemplary embodiment of the present invention will be described with reference to FIG. 4A to FIG. 4C. FIG. 4A to FIG. 4C are top plan views of examples of a pixel electrode in a liquid crystal display according to another exemplary embodiment of the present invention.

Referring to FIG. 4A, the shape of the first and second subpixel electrodes 191*a* and 191*b* is almost the same as that of the first and second subpixel electrodes 191*a* and 191*b* of the liquid crystal display of the exemplary embodiment shown in FIG. 2, however, the first to fourth minute branches 194*a*-194*d* and 195*a*-195*d* are formed closely two by two, and the first to fourth minute branches 194*a*-194*d* of the first subpixel electrode 191*a* and the first to fourth minute branches 195*a*-195*d* of the second subpixel electrode 191*b* are alternately disposed two by two. The areas of the region occupied by the first subpixel electrode 191*a* and the second subpixel electrode 191*b* are substantially the same.

Referring to FIG. 4B, the shape of the first and second subpixel electrodes 191*a* and 191*b* is almost the same as that of the first and second subpixel electrodes 191*a* and 191*b* of the liquid crystal display of the exemplary embodiment shown in FIG. 2, however the first to fourth minute branches 194*a*-194*d* and 195*a*-195*d* are formed closely three by three, and the first to fourth minute branches 194*a*-194*d* of the first subpixel electrode 191*a* and the first to fourth minute branches 195*a*-195*d* of the second subpixel electrode 191*b* are alternately disposed three by three. The areas of the region occupied by the first subpixel electrode 191*a* and the second subpixel electrode 191*b* are substantially the same.

Referring to FIG. 4C, the shape of the first and second subpixel electrodes 191*a* and 191*b* is almost the same as that of the first and second subpixel electrodes 191*a* and 191*b* of the liquid crystal display of the exemplary embodiment shown in FIG. 2, however the first to fourth minute branches 194*a*-194*d* and 195*a*-195*d* are formed closely four by four, and the first to fourth minute branches 194*a*-194*d* of the first subpixel electrode 191*a* and the first to fourth minute branches 195*a*-195*d* of the second subpixel electrode 191*b* are alternately disposed four by four. The areas of the region occupied by the first subpixel electrode 191*a* and the second subpixel electrode 191*b* are substantially the same.

Similarly, if the shape of the first and second subpixel electrodes 191*a* and 191*b* in the liquid crystal display according to an exemplary embodiment of the present invention may be changed in a variety of ways, the areas of the region occupied by the first subpixel electrode 191*a* and the second subpixel electrode 191*b* may be substantially the same, and the first to fourth minute branches 194*a*-194*d* and 195*a*-195*d* may be alternately disposed, the present invention may be applied to various shapes.

Figure 5:
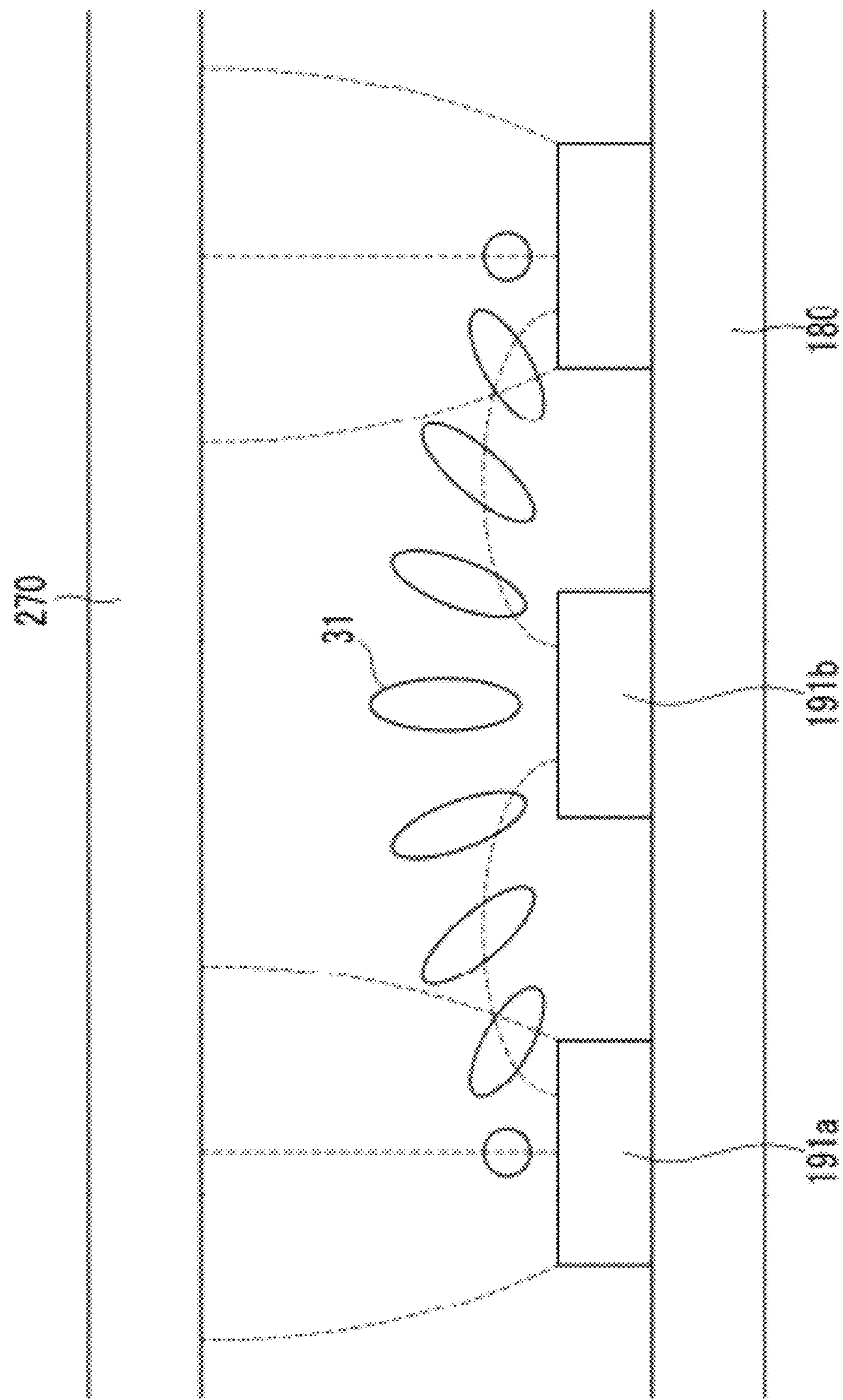
FIG. 5 is a schematic view showing an operation per each region in a liquid crystal display according to an exemplary embodiment of the present invention.

Next, an operation of a region in a liquid crystal display according to an exemplary embodiment of the present invention will be described with reference to FIG. 5 as well as FIG. 2 and FIG. 3. FIG. 5 is a schematic view showing an operation per each region in a liquid crystal display according to an exemplary embodiment of the present invention.

Referring to FIG. 2 and FIG. 3, if the gate signal is applied to the gate line 121, the data voltage is applied to the first and second subpixel electrodes 191*a* and 191*b* through the data lines 171*a* and 171*b*. Thus, the first and second subpixel electrodes 191*a* and 191*b* applied with the data voltage and the common electrode 270 applied with the common voltage form the electric field to the liquid crystal layer 3. Thus, liquid crystal molecules of the liquid crystal layer 3 change directions so that the major axes thereof become perpendicular to the direction of the electric field in response to the electric field. The degree of change of the polarization of the light that is incident on the liquid crystal layer 3 is changed according to the inclination degree of the liquid crystal molecules, and this change of the polarization appears as a change of the transmittance by the polarizer, thereby displaying images of the liquid crystal display.

In the liquid crystal display according to an exemplary embodiment of the present invention, the voltage between the first subpixel electrode 191*a* and the common electrode 270 is larger than the voltage between the second subpixel electrode 191*b* and the common electrode 270. Accordingly, the voltage applied to the first liquid crystal capacitor Clca formed between the first sub-pixel electrode 191*a* and the common electrode 270 and the voltage applied to the second liquid crystal capacitor Clcb formed between the second sub-pixel electrode 191*b* and the common electrode 270 are different from each other such that the declination angle of the liquid crystal molecules of the subpixels PEa and PEb are different from each other, and as a result the luminance of the two subpixels becomes different.

As shown in FIG. 5, if the first and second subpixel electrodes 191*a* and 191*b* are applied with the data voltage and the common electrode 270 is applied with the common voltage, the electric field is formed on the liquid crystal layer 3 between the two display panels 100 and 200. In FIG. 5, the electric field is indicated by a dotted line. As shown in FIG. 5, the edges of the first and second subpixel electrodes 191*a* and 191*b* distort the electric field such that the horizontal components determining the inclination direction of the liquid crystal molecules 31 are made, and if the voltage of the pixel electrode 191 is larger than the voltage of the common electrode 270, the horizontal components tend toward the outside of the pixel electrode 191. Also, as above-described, the polarities of the data voltages applied with the first subpixel electrode 191*a* and the second subpixel electrode 191*b* may be the same, and the magnitude of the data voltage applied to the first subpixel electrode 191*a* is larger than the magnitude of the data voltage applied to the second subpixel electrode 191*b*. Accordingly, the potential difference is generated between the first subpixel electrode 191*a* and the second subpixel electrode 191*b* such that a sub-electric field is generated, and the sub-electric field has the horizontal components substantially parallel to the horizontal components of the main electric field. Accordingly, as in the present exemplary embodiment, when the first subpixel electrode 191*a* and the second subpixel electrode 191*b* are alternately disposed, the strong horizontal electric field is generated between the first subpixel electrode 191*a* and the second subpixel electrode 191*b*.

By the main electric field and the sub-electric field, the long axes of the liquid crystal molecule 31 are arranged to change the direction to be perpendicular to the direction of the electric field. Accordingly, as shown in FIG. 5, the liquid crystal molecules 31 disposed in the region occupied by the first subpixel electrode 191*a* applied with the large voltage along with the common electrode 270 are inclined to have the long axis parallel to the first and second display panels 100 and 200 by the electric field of the vertical direction formed between the common electrode 270 and the first subpixel electrode 191*a*, and receive the influence of the sub-electric field of the horizontal direction closer to the edge of the first subpixel electrode 191*a* such that the liquid crystal molecules 31 are rotated in the horizontal direction and the inclination angle from the upper panel 200 is decreased.

The liquid crystal molecules 31 disposed between the first subpixel electrode 191*a* and the second subpixel electrode 191*b* increasingly receive the influence of the sub-electric field of the horizontal direction compared to the main electric field of the vertical direction further from the first subpixel electrode 191*a* such that the liquid crystal molecules 31 are gradually rotated in the horizontal direction and the inclination angle from the upper panel 200 is gradually decreased.

Also, the magnitude of the main electric field of the vertical direction generated between the common electrode 270 and the second subpixel electrode 191*b* is small such that the liquid crystal molecules 31 disposed in the region occupied by the second subpixel electrode 191*b* are partially rotated by the sub-electric field of the horizontal direction and are a little inclined.

Therefore, in the liquid crystal display according to an exemplary embodiment of the present invention, the first subpixel electrode 191*a* and the second subpixel electrode 191*b* applied with the different voltages with respect to the common voltage are alternately disposed, the liquid crystal molecules 31 are rotated with the increasing angle in the horizontal direction from the center of the first subpixel electrode 191*a* to the center of the second subpixel electrode 191*b* by the sub-electric field of the horizontal direction between the first subpixel electrode 191*a* and the second subpixel electrode 191*b* besides the main electric field of the vertical direction formed between the pixel electrode 191 and the common electrode 270, and the inclination angle from the upper panel 200 is gradually decreased. Accordingly, through one pixel PE, the liquid crystal molecules 31 are inclined with the various angels such that the different luminance is formed between the regions between the first subpixel electrode 191*a* and the second subpixel electrode 191*b* as well as the regions occupied by the first subpixel electrode 191*a* and the second subpixel electrode 191*b*.

Figure 6:
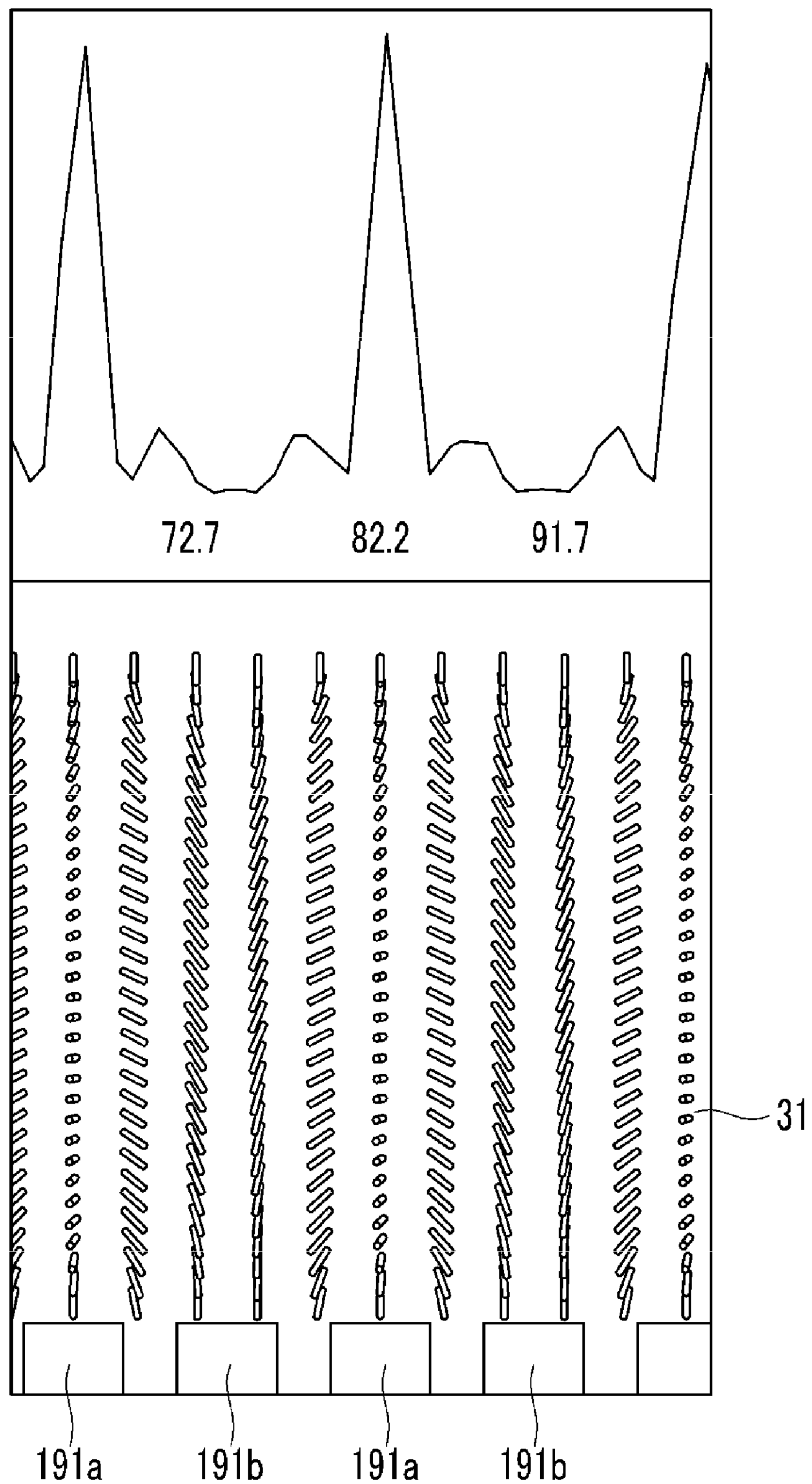
FIG. 6 is a view showing a cross-section of a liquid crystal display of one experimental example according to an embodiment of the present invention.
Figure 7:
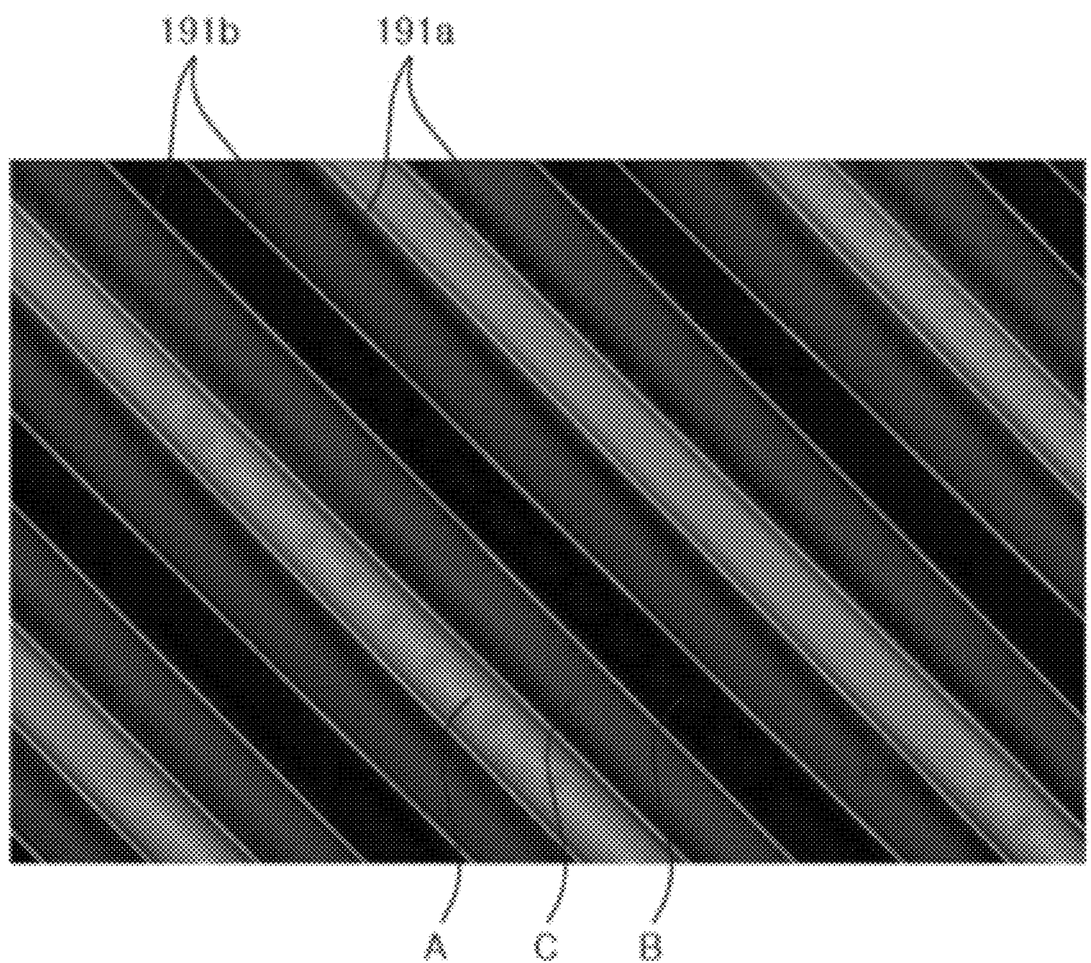
FIG. 7 is a view showing a portion of a first subpixel electrode and a second subpixel electrode of the liquid crystal display of one experimental example according to an embodiment of the present invention.

Next, the operation of the liquid crystal display according one experimental example of the present invention will be described with reference to FIG. 6 and FIG. 7. FIG. 6 is a view showing a cross-section of a liquid crystal display according to one experimental example of the present invention, and FIG. 7 is a view showing a portion of the first subpixel electrode 191*a* and the second subpixel electrode 191*b* of the liquid crystal display according to the experimental example of the present invention.

In this experimental example, to view the operation of the liquid crystal molecules 31, the common electrode 270 is applied with a voltage of about 0V, the first subpixel electrode 191*a* is applied with a voltage of about 7V, and the second subpixel electrode 191*b* is applied with a voltage of about 2.5V.

Referring to FIG. 6, it may be confirmed that the liquid crystal molecules 31 disposed on the first subpixel electrode 191*a* having a potential difference of 7V with respect to the common electrode 270 are partially rotated by the influence of the sub-electric field in the horizontal direction formed according to the edge of the first subpixel electrode 191*a*, and the long axes thereof are inclined parallel to the first subpixel electrode 191*a* and the common electrode 270. Also, it may be confirmed that the liquid crystal molecules 31 between the first subpixel electrode 191*a* and the second subpixel electrode 191*b* are rotated in the horizontal direction by the electric field of the horizontal direction between the first subpixel electrode 191*a* and the second subpixel electrode 191*b* and the inclination angle from the common electrode 270 is decreased, and the liquid crystal molecules 31 on the circumference of the second subpixel electrode 191*b* are rotated in the horizontal direction and the inclination angle from common electrode 270 is further decreased.

The change of the luminance of the liquid crystal display according to the operation of the liquid crystal molecule 31 will be described with reference to FIG. 7.

Referring to FIG. 7, there is a middle region C representing a middle luminance between a region A occupied by the first subpixel electrode 191*a* representing the brightest luminance and a region B occupied by the second subpixel electrode 191*b* representing the darkest luminance. Accordingly, in the liquid crystal display according to an exemplary embodiment of the present invention, the area of the regions occupied by the first subpixel electrode 191*a* and the second subpixel electrode 191*b* are the same such that the entire luminance of the liquid crystal display may be increased, and the regions B and C having the low luminance are wider than the region A occupied by the first subpixel electrode 191*a* having the brightest luminance such that an effect like that of the second subpixel electrode 191*b* that is formed to be wider than the first subpixel electrode 191*a* may be gained, compared with the conventional liquid crystal display in which the size of the subpixel electrode applied with the low voltage is larger that the size of the subpixel electrode applied with the high voltage by about 2 to 2.5 times.

According to the experimental example, in the liquid crystal display according to an exemplary embodiment of the present invention, the first subpixel electrode 191*a* and the second subpixel electrode 191*b* are alternately disposed such that the liquid crystal molecules 31 are operated to change an azimuth angle such that the liquid crystal molecules 31 are horizontally rotated and a zenith angle such that the liquid crystal molecules 31 are vertically rotated, and thereby the luminance difference of the liquid crystal display may be changed in a variety of ways. Accordingly, the transmittance of the liquid crystal display may be increased and the lateral visibility may be increased.

Figure 8:
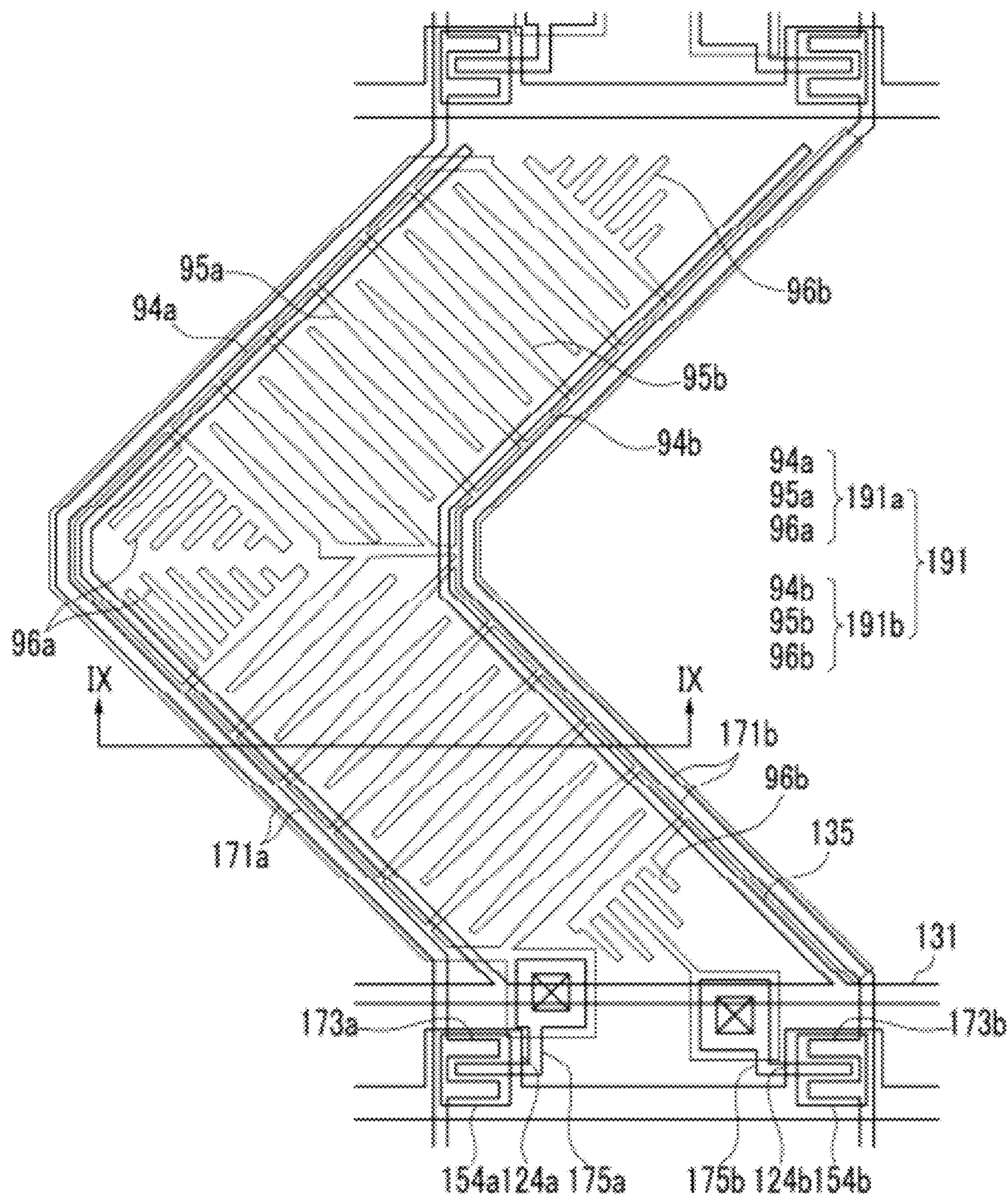
FIG. 8 is a top plan view of a liquid crystal display according to another exemplary embodiment of the present invention.
Figure 10:
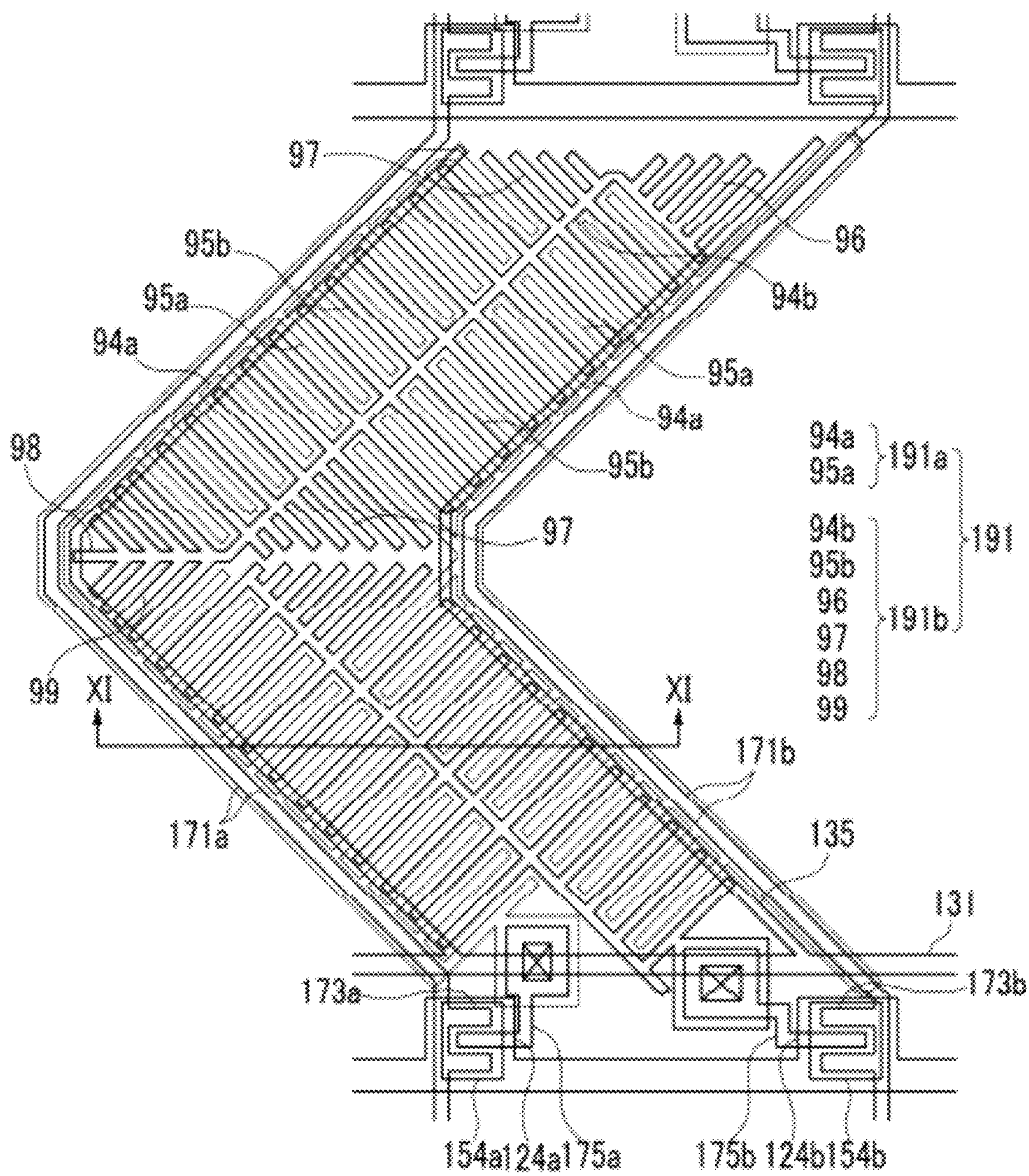
FIG. 10 is a top plan view of a liquid crystal display according to another exemplary embodiment of the present invention.
Figure 11:
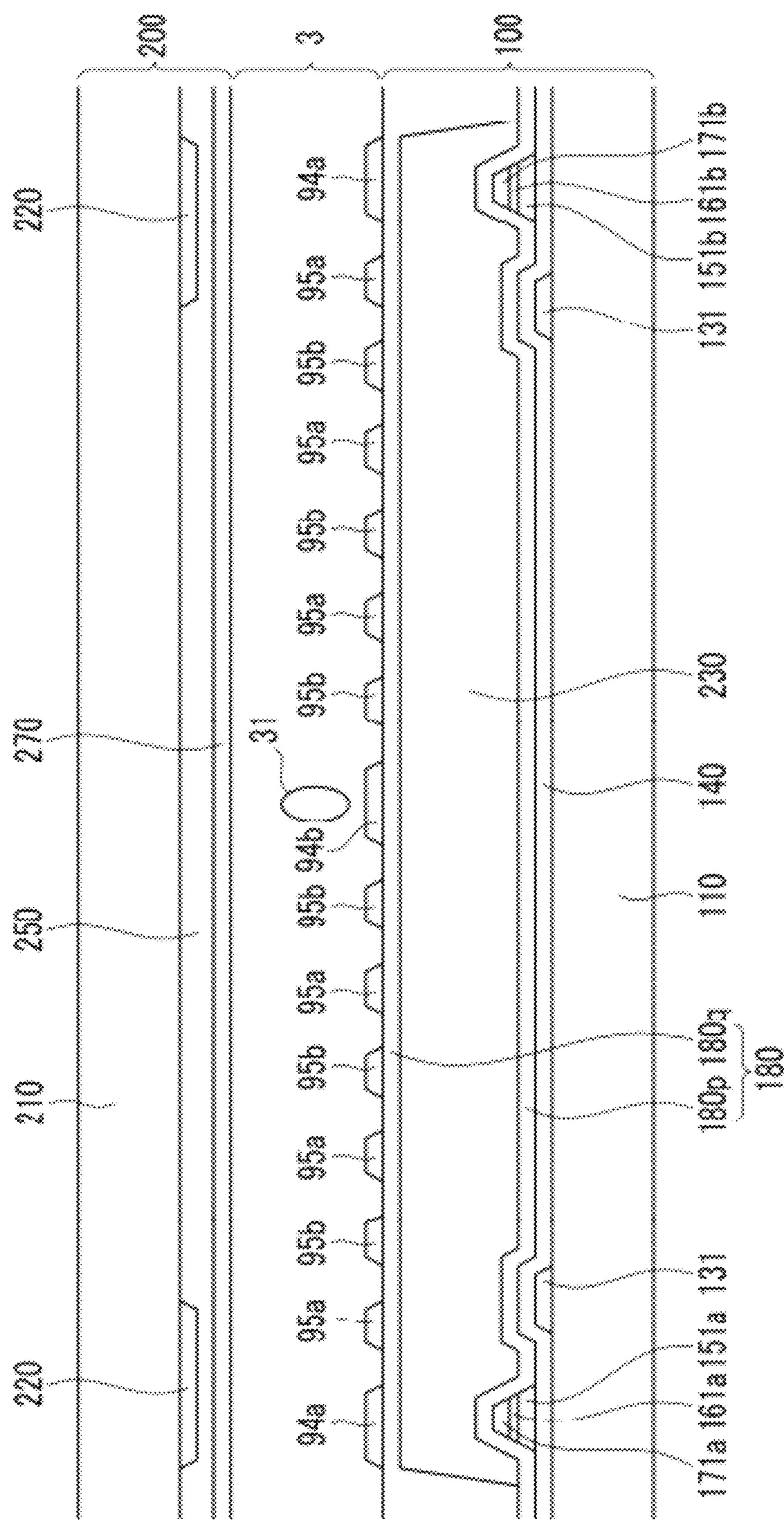
FIG. 11 is a cross-sectional view of the liquid crystal display shown in FIG. 10 taken along the line XI-XI.

Next, a liquid crystal display according to further exemplary embodiments of the present inventions will be described with reference to FIG. 8 to FIG. 11. FIG. 8 is a top plan view of a liquid crystal display according to another exemplary embodiment of the present invention, FIG. 9 is a cross-sectional view of a liquid crystal display according to the exemplary embodiment of FIG. 8, FIG. 10 is a top plan view of a liquid crystal display according to another exemplary embodiment of the present invention, and FIG. 11 is a cross-sectional view of the liquid crystal display shown in FIG. 10 taken along the line XI-XI.

Figure 9:
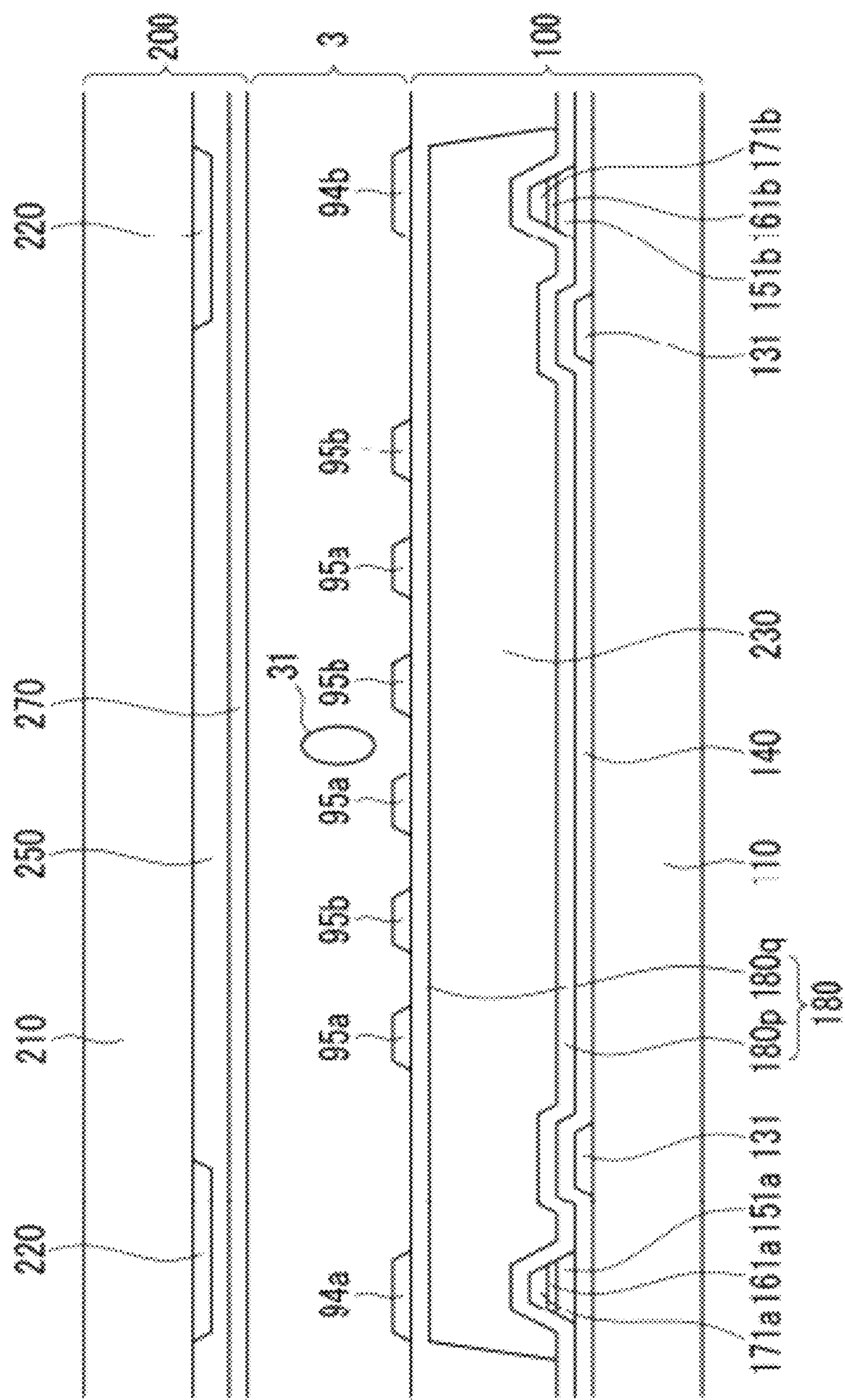
FIG. 9 is a cross-sectional view of a liquid crystal display according to the exemplary embodiment of the present invention of FIG. 8.

A layered structure of a liquid crystal display according to the exemplary embodiment shown in FIG. 8 and FIG. 9 is similar to the liquid crystal display shown in the embodiments of FIG. 2 and FIG. 3.

However, differently from the liquid crystal display shown in the embodiments of FIG. 2 and FIG. 3, each data line 171 includes a plurality of curved portions alternately connected to each other, and is periodically curved. The curved portions include a pair of oblique portions that are connected to each other thereby forming a substantially chevron shape, and the oblique portions form an angle of about 45° with the gate lines 121. Also, each pixel electrode 191 includes the first subpixel electrode 191*a* including a stem 94*a* parallel to the curved portion of the left data line 171*b* and a plurality of minute branches 95*a* extending from the stem 94*a*, and the second subpixel electrode 191*b* including a stem 94*b* parallel to the curved portion of the right data line 171*a* and a plurality of minute branches 95*b* extending vertically from the stem 94*b*, while the areas of the regions occupied by the first subpixel electrode 191*a* and the second subpixel electrode 191*b* are almost the same, and the minute branches 95*a* of the first subpixel electrode 191*a* and the minute branches 95*b* of the second subpixel electrode 191*b* are alternately disposed. The minute branches 95*a* disposed on the most central position among the minute branches 95*a* of the first subpixel electrode

191*a* include assistance branches 96*a* extending vertically from the minute branches 95*a*, and the minute branches 95*b* disposed on the most upper and most lower positions among the minute branches 95*b* of the second subpixel electrode 191*b* include assistance branches 96*b* extending vertically from the minute branches 95*b*. The assistance branches 96*a* and 96*b* prevent the generation of regions that do not contribute to the display due to a bend of the pixel.

The various characteristics of the liquid crystal display shown in the embodiments of FIG. 2 to FIG. 3 may be applied to the liquid crystal display shown in FIG. 8 and FIG. 9.

Next, referring to FIG. 10 and FIG. 11, a layered structure of a liquid crystal display according to the exemplary embodiment shown in FIG. 10 and FIG. 11 is similar to the liquid crystal display shown in the embodiments of FIG. 2 and FIG. 3.

However, differently from the liquid crystal display shown in the embodiments of FIG. 2 and FIG. 3, each data line 171 includes a plurality of curved portions alternately connected to each other, and is periodically curved. The curved portions include a pair of oblique portions that are connected to each other thereby forming a substantially chevron shape, and the oblique portions form an angle of about 45° with the gate lines 121. Also, each pixel electrode 191 includes the first subpixel electrode 191*a* including a stem 94*a* parallel to the curved portion of two data lines 171*a* and 171*b* and a plurality of minute branches 95*a* extending from the stem 94*a*, and the second subpixel electrode 191*b* including a stem 94*b* parallel to the central portion between the curved portions of two data lines 171*a* and 171*b* and a plurality of minute branches 95*b* extending left and right from the stem 94*b*, while the areas of the regions occupied by the first subpixel electrode 191*a* and the second subpixel electrode 191*b* are almost the same, and the minute branches 95*a* of the first subpixel electrode 191*a* and the minute branches 95*b* of the second subpixel electrode 191*b* are alternately disposed. The second subpixel electrode 191*b* includes minute branches 97 disposed on the upper and central portions of the pixel and extending from the stem 94*b*. The interval between the minute branches 97 is narrower compared to the other minute branches 94*b*, and they are not alternately disposed with the minute branches 95*a* of the first subpixel electrode 191*a*. The minute branches 95*b* disposed on the most upper position among the minute branches 95*b* of the second subpixel electrode 191*b* include an assistance branch 96 vertically extending from the minute branches 95*b*. Also, the second subpixel electrode 191*b* includes a transverse branch 98 extending in the horizontal direction from the stem 94*b*, and assistance branches 99 extending in the upper and lower diagonal directions from the transverse branch 98. The minute branches 97 and the assistance branches 96 and 99 prevent the generation of regions that do not contribute to the display due to the curve of the pixel.

The various characteristics of the liquid crystal display shown in the embodiments of FIG. 2 to FIG. 3 may be applied to the liquid crystal display shown in FIG. 10 and FIG. 11.

In the above-described exemplary embodiment, the first subpixel electrode 191*a* and the second subpixel electrode 191*b* may be applied with different data voltages through different switching elements. However, the magnitude of the voltages applied to the first subpixel electrode 191*a* and the second subpixel electrode 191*b* may be controlled by using an additional capacitor while applying the same data voltage through one switching element to apply a larger voltage to the first subpixel electrode 191*a* than the second subpixel electrode 191*b*, and a liquid crystal display may be provided according to one or more embodiments.

As above-described, in the liquid crystal display according to an exemplary embodiment of the present invention, the areas occupied by the first subpixel electrode 191*a* and the second subpixel electrode 191*b* are almost the same, and the first subpixel electrode 191*a* and the second subpixel electrode 191*b* are alternately disposed such that the liquid crystal molecules 31 are operated to change an azimuth angle at which the liquid crystal molecules 31 are horizontally rotated and a zenith angle at which the liquid crystal molecules 31 are vertically rotated, and thereby the luminance difference of the liquid crystal display may be variously changed while increasing the entire luminance. Accordingly, the transmittance of the liquid crystal display may be increased and the lateral visibility may be increased.

While embodiments of the invention have been described, it is to be understood that the disclosure is not limited to the disclosed embodiments, but, on the contrary, is intended to cover various modifications and equivalent arrangements included within the spirit and scope of the appended claims.

What is claimed is:

1. A liquid crystal display comprising:

a first insulation substrate;

a pixel electrode formed on the first insulation substrate, and including a first subpixel electrode and a second subpixel electrode separated from each;

a second insulation substrate facing the first insulation substrate;

a common electrode formed on the second insulation substrate and facing the pixel electrode; and a liquid crystal layer formed between the pixel electrode and the common electrode, and including a plurality of liquid crystal molecules, wherein the first subpixel electrode includes a first stem disposed along an edge of the pixel electrode and a plurality of first minute branches obliquely extending from the first stem, and the second subpixel electrode includes a second stem with a cross-shape formed at the center of the pixel electrode and a plurality of second minute branches obliquely extending from the second stem, and the first minute branches of the first subpixel electrode and the second minute branches of the second subpixel electrode are alternately disposed.

2. The liquid crystal display of claim 1, wherein the first subpixel electrode and the second subpixel electrode are disposed in one pixel, and the ratio of the areas of the first subpixel electrode and the second subpixel electrode is in the range of 1.5:1 to 1:1.5.

3. The liquid crystal display of claim 2, wherein the voltage applied to the first subpixel electrode and the voltage applied to the second subpixel electrode have the same polarity, and the magnitude of the voltage applied to the first subpixel electrode is larger than that of the voltage applied to the second subpixel electrode.

4. The liquid crystal display of claim 2, wherein the shape of the pixel electrode is substantially a quadrangle.

5. The liquid crystal display of claim 1, wherein the first minute branches of the first subpixel electrode and the second minute branches of the second subpixel electrode are alternately disposed in the unit of a plurality of minute branches, and the plurality of minute branches include two to four minute branches.

6. The liquid crystal display of claim 1, further comprising:

a pair of data lines formed on the first substrate, and disposed on the left and right sides of the pixel electrode, wherein the pair of data lines include curved portions alternately connected to each other and periodically curved, the first subpixel electrode includes a third stem closely parallel to one data line of the pair of data lines, and the first minute branches of the first subpixel electrode are extended from the third stem.

7. The liquid crystal display of claim 6, wherein:

the second subpixel electrode includes a fourth stem closely parallel to the remaining data line of the pair of data lines, and the second minute branches of the second subpixel electrode are extended from the fourth stem.

8. The liquid crystal display of claim 7, wherein the first subpixel electrode and the second subpixel electrode include an assistant extending from the first and second minute branches.

9. The liquid crystal display of claim 1, further comprising a pair of data lines formed on the first substrate, and disposed on the left and right sides of the pixel electrode, wherein the pair of data lines include curved portions alternately connected to each other and periodically curved, the first subpixel electrode includes a pair of third stems parallel to the pair of data lines, and the first minute branches of the first subpixel electrode are extended from the pair of third stems.

10. The liquid crystal display of claim 9, wherein the second subpixel electrode includes a fourth stem disposed parallel to and between the pair of data lines, and the second minute branches of the second subpixel electrode are extended from the fourth stem.

11. The liquid crystal display of claim 1, wherein the pixel electrode includes four regions having different directions of the minute branches.

12. The liquid crystal display of claim 1, wherein the first subpixel electrode and the second subpixel electrode are disposed in one pixel, a voltage applied to the first subpixel electrode and a voltage applied to the second subpixel electrode have the same polarity, and the magnitude of the voltage applied to the first subpixel electrode is larger than the magnitude of the voltage applied to the second subpixel electrode.

13. The liquid crystal display of claim 12, further comprising a pair of data lines formed on the first substrate, and disposed on the left and right sides of the pixel electrode, wherein the pair of data lines include curved portions alternately connected to each other and periodically curved, the first subpixel electrode includes a third stem parallel to one data line of the pair of data lines, and the first minute branches of the first subpixel electrode are extended from the third stem.

14. The liquid crystal display of claim 13, wherein the second subpixel electrode includes a fourth stem closely parallel to the remaining data line of the pair of data lines, and the second minute branches of the second subpixel electrode are extended from the fourth stem.

15. The liquid crystal display of claim 12, wherein the pixel electrode includes four regions having different directions of the minute branches.

* * * * *